US007249620B2

(12) United States Patent
Croissant et al.

(10) Patent No.: US 7,249,620 B2
(45) Date of Patent: Jul. 31, 2007

(54) PNEUMATIC TIRE

(75) Inventors: Bernard Croissant, Bastogne (BE); Claude Jacque, Bissen (LU); Alain Emile Francois Roesgen, Asselborn (LU); Peter Phelps Roch, Ettelbruck (LU); Marc Weydert, Strassen (LU); Marc Ernest Ginter, Mersch (LU); Andrew Frederick Weimer, Akron, OH (US); Gia Van Nguyen, Blagny (FR); Anne-France Gabrielle Jeanne-Marie Cambron, Petange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 283 days.

(21) Appl. No.: 10/889,492

(22) Filed: Jul. 12, 2004

(65) Prior Publication Data

US 2006/0005905 A1 Jan. 12, 2006

(51) Int. Cl.
*B60C 11/03* (2006.01)
*B60C 11/117* (2006.01)
*B60C 11/24* (2006.01)

(52) U.S. Cl. .................. 152/154.2; 152/176; 152/188; 152/209.5; 152/209.6; 152/209.17

(58) Field of Classification Search ............ 152/209.5, 152/209.17, 209.18, 175, 176, 179, 187, 152/188, 191, 154.2, 209.6; 156/114, 123, 156/125, 126, 127, 128.6, 129
See application file for complete search history.

(56) References Cited

U.S. PATENT DOCUMENTS

| | | | | |
|---|---|---|---|---|
| 1,013,596 A * | 1/1912 | Freschl | .................. | 152/188 |
| 1,876,016 A * | 9/1932 | Pederson | .................. | 152/209.5 |
| 1,897,974 A * | 2/1933 | Wolf | .................. | 152/188 |
| 2,148,343 A * | 2/1939 | Flautt | .................. | 152/210 |
| 2,207,098 A * | 7/1940 | Maynard | .................. | 156/293 |
| 2,272,891 A * | 2/1942 | Coben | .................. | 152/208 |
| 2,345,518 A * | 3/1944 | Wendel | .................. | 152/209.17 |
| 2,538,491 A | 1/1951 | Winston | .................. | 152/209 |
| 3,899,013 A * | 8/1975 | Kruse | .................. | 152/176 |
| 5,316,063 A | 5/1994 | Lagnier | .................. | 152/209 |
| 6,089,290 A * | 7/2000 | Chlebina et al. | .................. | 152/209.6 |
| 6,408,910 B1 | 6/2002 | Lagnier et al. | .................. | 152/209.17 |
| 6,591,881 B2 | 7/2003 | Artrip | .................. | 152/209.5 |
| 6,905,564 B1 * | 6/2005 | O'Brien et al. | .................. | 156/123 |
| 2004/0016491 A1 * | 1/2004 | Martin et al. | .................. | 152/209.5 |
| 2004/0089384 A1 * | 5/2004 | Lopez et al. | .................. | 152/154.2 |
| 2005/0081972 A1 * | 4/2005 | Lopez | .................. | 152/209.17 |
| 2005/0092411 A1 * | 5/2005 | O'Brien | .................. | 156/114 |
| 2006/0005912 A1 * | 1/2006 | Weydert et al. | .................. | 156/128.1 |
| 2006/0090829 A1 * | 5/2006 | Lopez | .................. | 152/209.18 |

FOREIGN PATENT DOCUMENTS

| | | | |
|---|---|---|---|
| FR | 1498340 | * | 9/1967 |
| JP | 2-246809 | * | 10/1990 |
| WO | WO 02/090094 | * | 11/2002 |
| WO | WO 03/097384 A | | 11/2003 |

* cited by examiner

*Primary Examiner*—Steven D. Maki
(74) *Attorney, Agent, or Firm*—Nancy T. Krawczyk

(57) ABSTRACT

A tire with a changing tread pattern is formed by first forming a tire having a tread, the tread having at least one circumferential or lateral groove. A wearable filler, having a configuration corresponding to at least a portion of the circumferential or lateral groove formed in the tire, is located in the radially outer portion of the circumferential or lateral groove or a portion of the circumferential or lateral groove, and secured within the grooves so as to create a groove void radially inward of the wearable filler, the void being exposed upon wear of the tire tread.

19 Claims, 9 Drawing Sheets

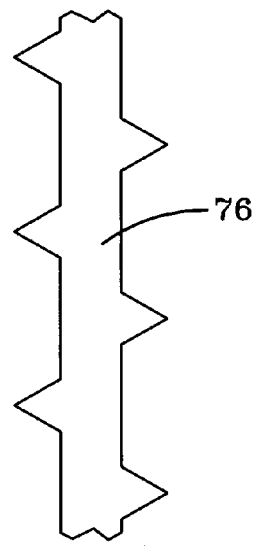 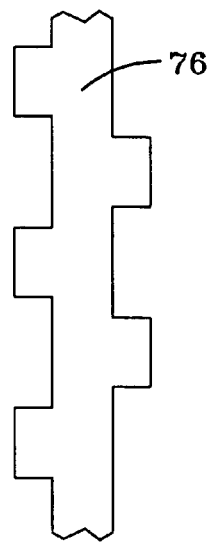 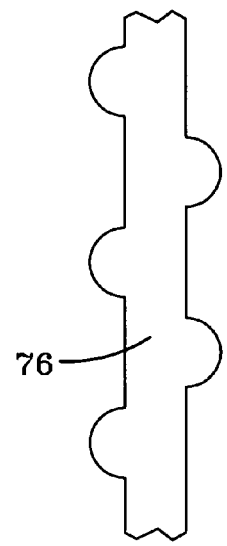
FIG-5E    FIG-5F    FIG-5G
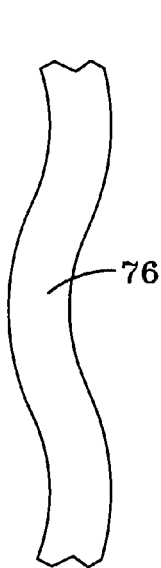  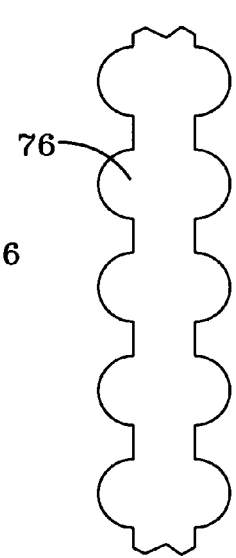 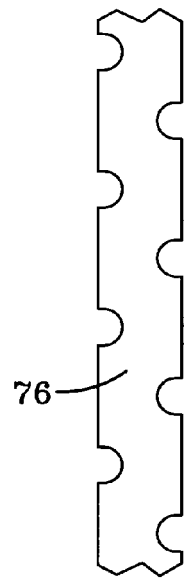
FIG-5H  FIG-5I  FIG-5J  FIG-5K

PNEUMATIC TIRE

FIELD OF THE INVENTION

The present invention relates to a pneumatic tire, and more particularly to a tread of a pneumatic tire wherein the tread is configured to provide a different tread pattern as the tire is worn. The invention also discloses method for manufacturing such a tire and tire tread.

BACKGROUND OF THE INVENTION

Tire tread patterns are provided with numerous elements such as ribs and blocks, the elements being separated by circumferential and/or transverse grooves. The grooves provide means for water evacuation and form the biting edges of the tread elements.

When a tire is new, the tread has a maximum tread height. This initial height may vary depending upon the intended use of the tire; a winter tire has an increased tread depth in comparison to an all season tire. Regardless of the initial tread depth, when the tire is new, the tread elements have an initial stiffness. The actual stiffness of the tread elements is dictated by the block size, shape, and the presence of any siping. As the tread is worn, the block height decreases while the tread element stiffness increases. As the tread stiffness increases, some desired tire characteristics, such as wet skid and wet handling, decrease. Hydroplaning characteristics also decrease with increased tread wear due to the reduced groove volume.

Methods have been proposed to maintain a relative tread stiffness as the tire wears. One method is to use split siping, wherein the siping is subdivided below the initial tread surface, as shown in U.S. Pat. Nos. 2,538,491 and 5,316,063. As the tread wears, the single sipe becomes multiple sipes. The increased siping reduces the tread element stiffness.

Disclosed in U.S. Pat. No. 6,408,910 is a method to maintain a desired groove volume wherein the tire is manufactured with molds that create submerged grooves that appear when the tread is worn. However, such a tire is difficult to manufacture due to the necessity of removing the molds that create the submerged grooves.

SUMMARY OF THE INVENTION

Disclosed herein is a pneumatic tire. The tire is designed to have a variable tread pattern, the tread pattern changing with wear, to achieve similar tread performance for the tire when both new and worn. The changing pattern optimizes the worn tire performance in an attempt to maintain the tire's wet performance characteristics.

Also disclosed is a pneumatic tire wherein when the tire is a new, or unworn, the tread has a stiff closed design. As the tire is worn, due to the tread configuration and the disclosed invention, the tread is softer with a more open design.

Also disclosed is a tire having a tire tread. The tread has at least one circumferential or lateral groove. Located in the radially outer portion of the circumferential or lateral groove or a portion of the circumferential or lateral groove is a wearable filler. A groove void is created radially inward of the wearable filler. The void is exposed upon wear of the tire tread. The wearable filler is preferably manufactured separately from the tire tread, and inserted into the circumferential or lateral groove or a portion of the circumferential or lateral groove.

In one disclosed aspect of the invention, the circumferential or lateral groove or a portion of the circumferential or lateral groove has a pair of opposing groove sidewalls. The radially outer portion of the opposing groove sidewalls of the circumferential or lateral groove or the portion of the circumferential or lateral groove have a greater width, as measured between opposing groove sidewalls, than the radially inner portion of the opposing groove sidewalls of the circumferential or lateral groove or the portion of the circumferential or lateral groove. The wearable filler is located in the greater width portion of the circumferential or lateral groove or a portion of the circumferential or lateral groove.

In another aspect of the invention, the wearable filler is located in a circumferential groove and the wearable filler has a ring shaped configuration having a length similar to the circumferential length of the tire tread. The wearable filler, when provided with the ring shaped configuration, may have a variety of configurations, including having a plurality of branches extend from the ring shaped wearable filler, or having at least one of the opposing sides of the ring formed with repeating geometric configurations.

In another aspect of the invention, the wearable filler to be placed in the tread groove may have a variable depth in the radial direction of the tread. This variable depth feature of the wearable filler may occur along the shortest length axis of the filler or along the greatest length axis of the filler.

In another aspect of the invention, the wearable filler may be comprised of similar interlocking individual elements, each wearable filler element having a length less than the circumferential length of the tire tread.

In another aspect of the invention, the wearable filler may be comprised of at least one non-connected individual element, the element being located at preselected locations in the tread.

In another aspect of the invention, the wearable filler has at least one sipe therein. The sipe may be located on the radially inner side of the wearable filler or on the radially outer side of the wearable filler.

In another aspect of the invention, the groove void created radially inward of the wearable filler is at least one sipe.

In another aspect of the invention, the wearable filler is formed from an elastomeric material and the tire tread is comprised of a different elastomeric material. Alternatively, when formed from an elastomeric material, the radially inner portion of the wearable filler may be formed from a colored elastomeric material differing in color from a radially outer portion of the wearable filler.

In another aspect of the invention, within the groove void created radially inward of the wearable filler, a self-eliminating material may be provided.

In another aspect of the invention, the wearable filler has a configuration that enables the wearable filler to mechanically engage the circumferential or lateral groove or a portion of the circumferential or lateral groove.

Definitions

The following definitions are controlling for the disclosed invention.

"Annular" means formed like a ring.

"Axial" and "axially" are used herein to refer to lines or directions that are parallel to the axis of rotation of the tire.

"Circumferential" means lines or directions extending along the perimeter of the surface of the annular tire parallel to the Center Line (CL) and perpendicular to the axial direction.

"Groove" means an elongated void area in a tread that may extend circumferentially or laterally about the tread in a straight curved, or zigzag manner. Circumferentially and laterally extending grooves sometimes have common portions and may be sub classified as "wide", "narrow", or "sipe". A sipe typically is formed by steel blades inserted into a cast or machined mold or tread ring therefore. In the appended drawings, excluding close up drawings, sipes are illustrated by single lines because they are so narrow. A "sipe" is a groove having a width in the range from about 0.2% to 0.8% of the compensated tread width, whereas a "narrow groove" has a width in the range from about 0.8% to 3% of the compensated tread width and a "wide groove" has a width greater than 3% thereof. The "groove width" is equal to tread surface area occupied by a groove or groove portion, the width of which is in question, divided by the length of such groove or groove portion; thus, the groove width is its average width over its length. Grooves, as well as other voids, reduce the stiffness of tread regions in which they are located. Sipes often are used for this purpose, as are laterally extending narrow or wide grooves. Grooves may be of varying depths in a tire. The depth of a groove may vary around the circumference of the tread, or the depth of one groove may be constant but vary from the depth of another groove in the tire.

"Inner" means toward the inside of the tire and "outer" means toward its exterior.

"Lateral" means an axial direction.

"Nonskid" means the depth of grooves in a tire tread.

"Radial" and "radially" are used to mean directions radially toward or away from the axis of rotation of the tire.

BRIEF DESCRIPTION OF THE DRAWINGS

The invention will be described by way of example and with reference to the accompanying drawings in which:

FIGS. 5A-5K are various embodiments of a post assembled tread element;

DETAILED DESCRIPTION OF THE INVENTION

Figure 1:
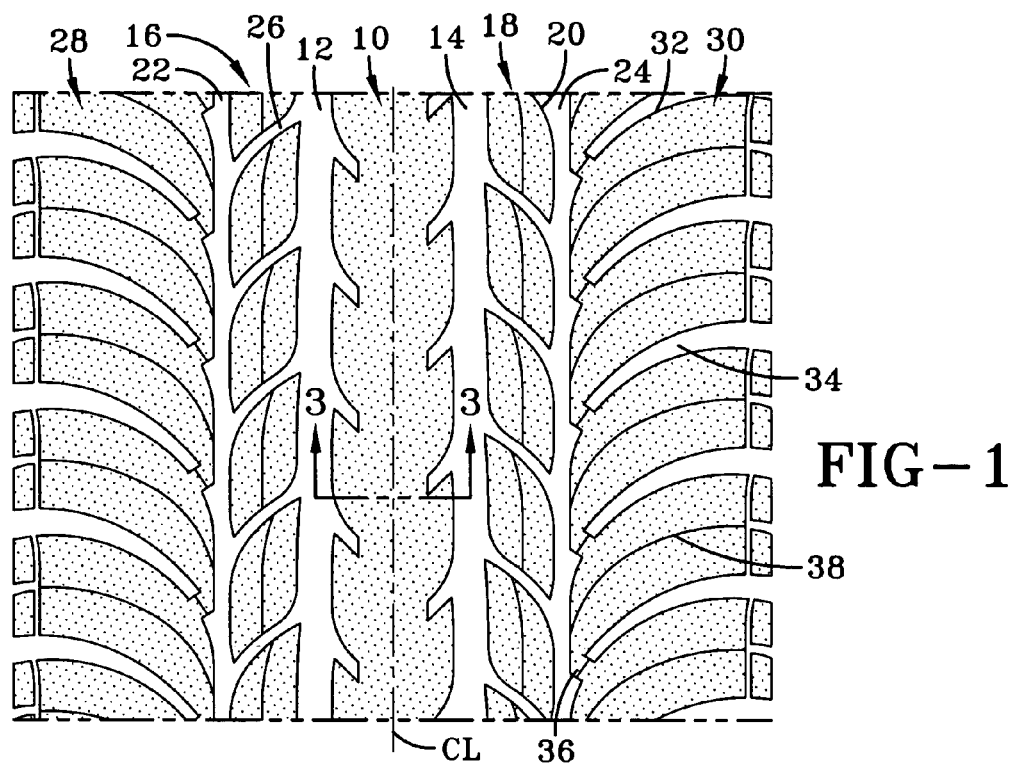
FIG. 1 is a tread in accordance with the invention.

The following language is of the best presently contemplated mode or modes of carrying out the invention. This description is made for the purpose of illustrating the general principles of the invention and should not be taken in a limiting sense. The scope of the invention is best determined by reference to the appended claims.

A tire tread, located on the radially outer surface of a tire, is characteristically defined by a plurality of extending tread elements in the form of blocks and/or ribs. Such tread elements are formed by circumferentially extending and/or laterally extending grooves. In the exemplary tread of FIG. 1, at the unworn stage, the tread is defined by four circumferentially extending grooves, dividing the tread into five rows of tread elements. The tread element row 10 located on the tread centerline CL is a rib defined by circumferential grooves 12, 14. The tread element rows 16, 18 bordering the center tread element row 10 are a plurality of blocks 20 formed by the circumferential rows 12, 14, 22, 24 and lateral grooves 26.

Axially outward of the outer circumferential rows 22, 24 are the axially outermost tread element rows 28, 30. These rows 28, 30 have a plurality of quasi blocks 32. The blocks 32 are formed by the circumferential grooves 22, 24 and inclined lateral grooves 34; however, the blocks 32 are connected at the axially inner edges by a connecting element 36. The blocks 20, 32 and the connecting element 36 are also provided with sipes 38 to increase the number of biting edges in the tread.

The tread of FIG. 1 is the tread at the unworn stage, but it is not the tire tread formed during molding of the tire employing the tread, nor is it the same tread pattern that occurs after wear of the tire.

Figure 2:
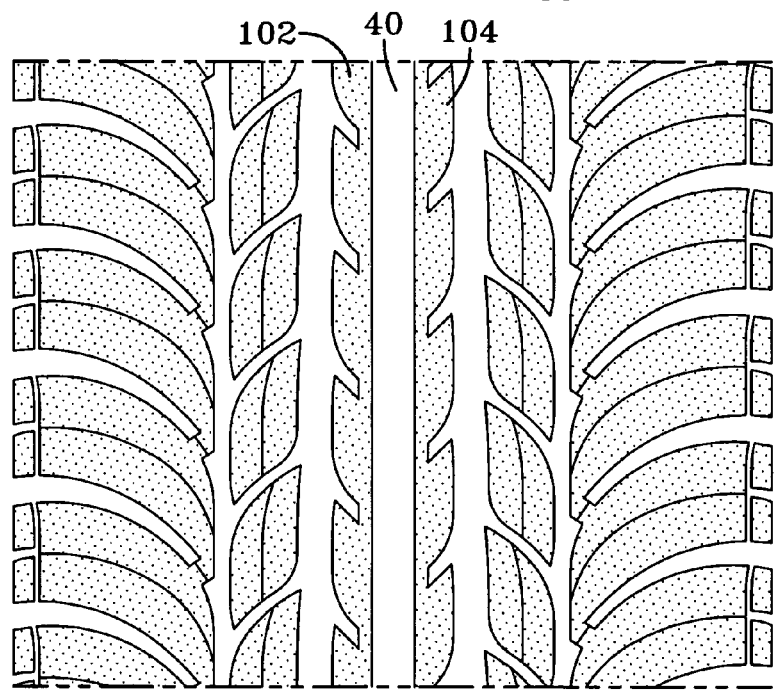
FIG. 2 is the tread of FIG. 1, following a defined amount of wear.

The tread of FIG. 2 is the tread of FIG. 1 after approximately 30% wear and is similar to the tread configuration of the tread of FIG. 1 after molding of the tire. The worn/molded tread has an additional circumferential groove 40 that now divides the center tread element row 10 into two smaller width rows 102, 104. The presence of the exposed groove 40 after a period of wear increases the wet performance characteristics of the tire.

Figure 3:
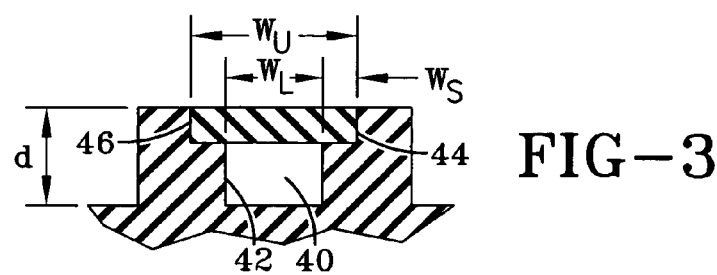
FIG. 3 is a cross-sectional view along lines 3-3 in FIG. 1.

The groove 40 is present in the tread when the tire is cured. FIG. 3 is a cross-sectional view of the center tread element row 10 of the unworn tire tread, along line 3-3 in FIG. 1. The tread has a tread depth d measured from the non-skid depth to the tread surface. The groove 40, when initially formed has groove walls 42 of a dual width configuration. The width $W_U$ between the groove walls 42 in the radially outer portion of the groove 40 is greater than width $W_L$ between the groove walls 42 in the radially inner portion of the groove 40. Due to the differing widths $W_U$, $W_L$ of the groove 40, the groove walls 42 have stepped portions 44. Each step portion 44 has a width $W_S$ of 5 to 80% of the lower groove width $W_L$. The step portions 44 provide a surface upon which a post-assembled tread element 46 (hereinafter referred to as a PATE) is applied.

A PATE is a separately shaped rubber element designed to be worn away during normal tire wear, i.e. a PATE is a wearable filler inserted in a groove or a portion of a groove. The PATE 46 applied to the tread of FIG. 2 is formed as a long strip of rubber or a ring shaped rubber element. The presence of the PATE 46 results in a hidden groove 40 that is revealed after a predetermined amount of tread wear.

Figure 4A:
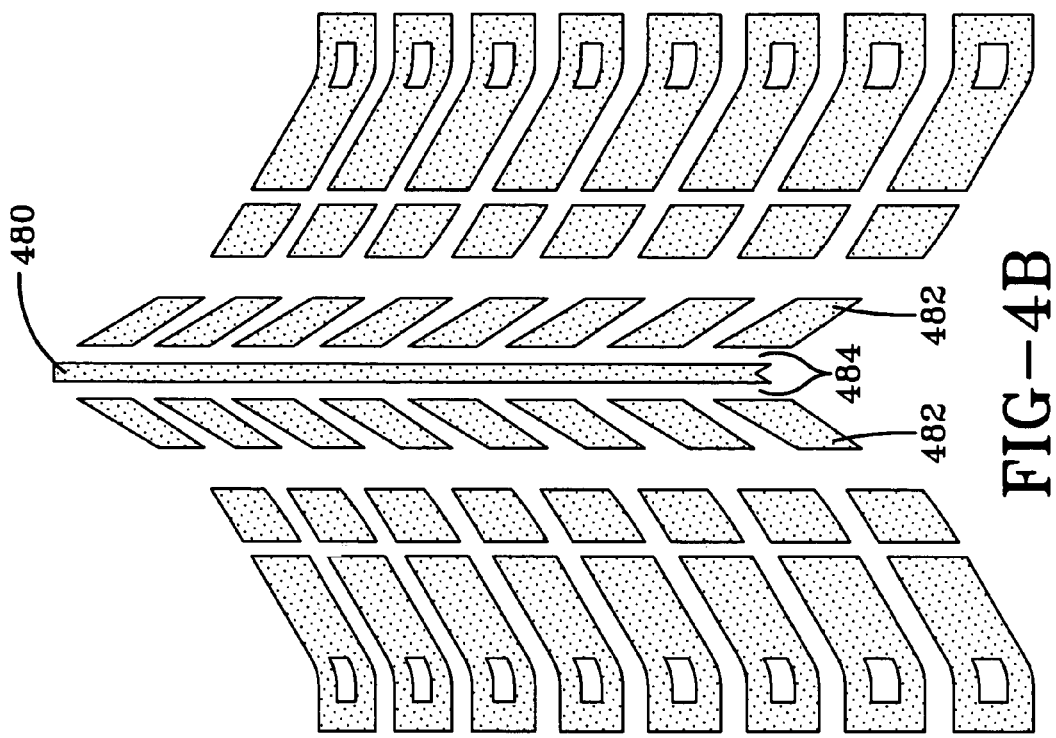
FIG. 4A is another tread embodiment in accordance with the invention.

FIG. 4A illustrates another tire tread configuration for an unworn tread. The center tread element row 10 is a continuous rib 48, functioning more as individual blocks due to the inclined lateral grooves 50. Axially outward of the center tread element row 10, the intermediate tread element rows 16, 18, have a plurality of individual blocks 52, 54. The outermost tread element rows 28, 30 are formed from a plurality of blocks 58, 60.

Figure 4B:
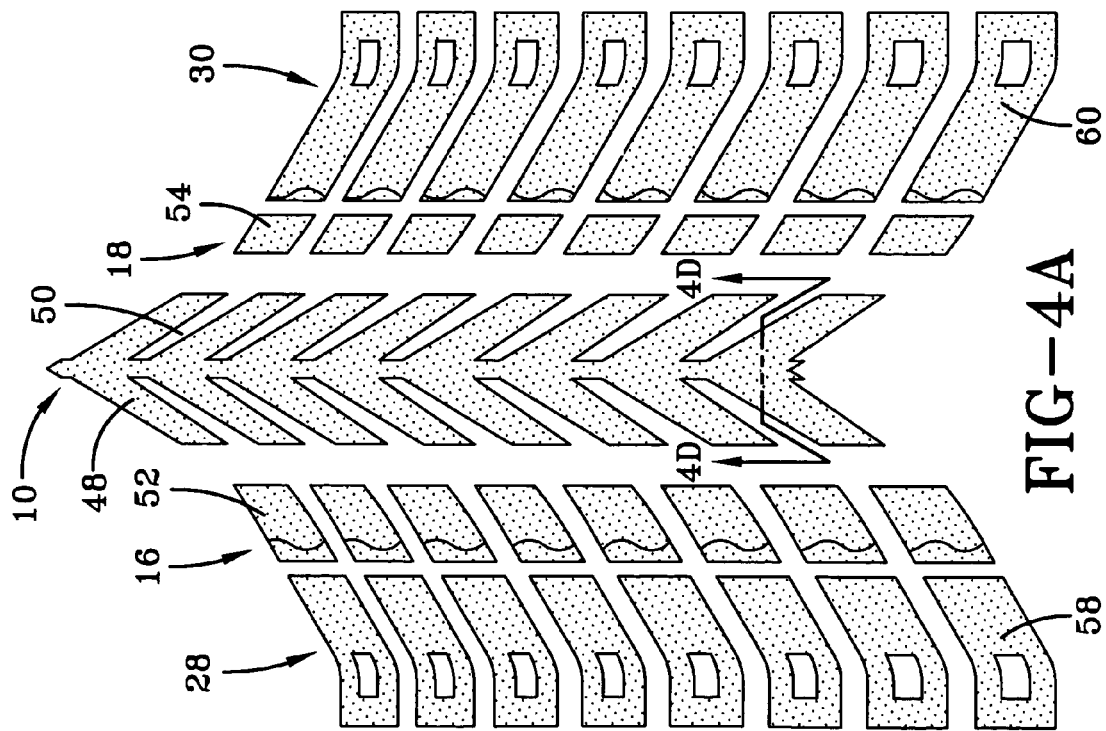
FIG. 4B is the tread of FIG. 4A, following a defined amount of wear.

Upon wear of the tread of FIG. 4A, the tread pattern of FIG. 4B is exposed. The center tread row element 10 is transformed into a narrow width rib 480 located on the tread centerline and axially adjacent rows of blocks 482 separated by new circumferential grooves 484. Instead of using multiple long strips of rubber or multiple rubber rings, multiple similar shaped PATEs 62 are used, with one PATE 62 for each set of axially adjacent blocks 482. The individual PATEs 62 used in a single tread may have differing lengths, based on any pitching techniques used in the tread design.

Figure 4C:
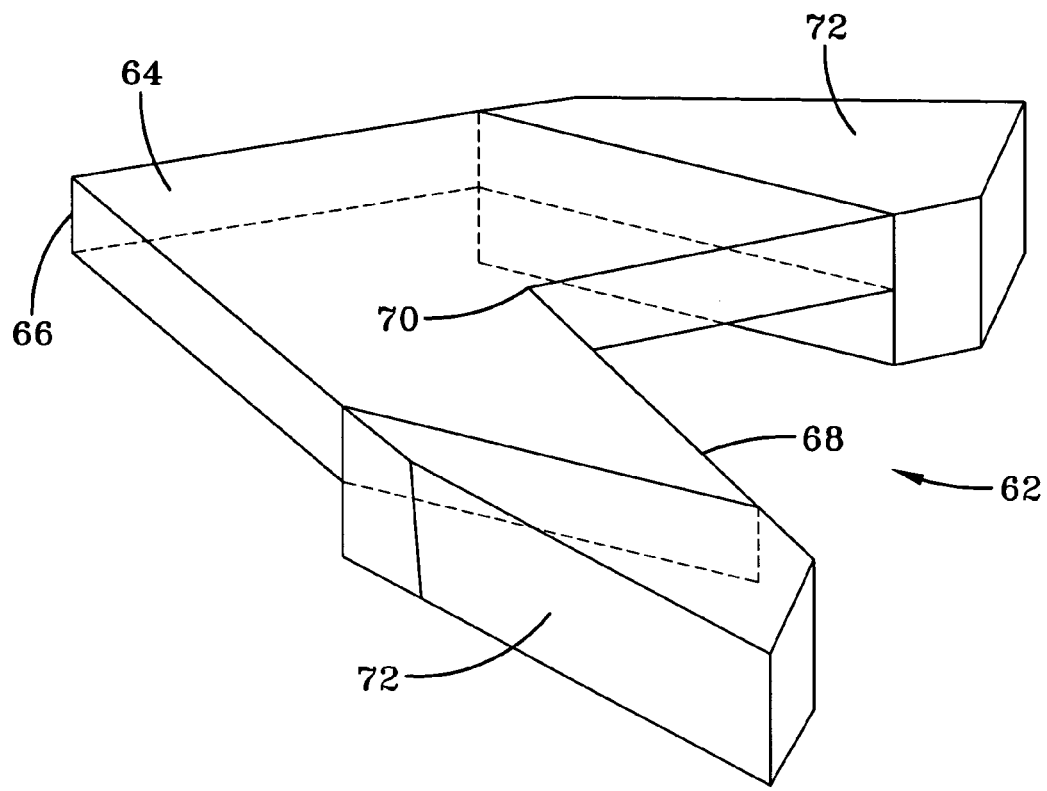
FIG. 4C is one embodiment of a post-assembled tread element.

The individual PATEs 62 also have several features that enable the PATEs 62 to lock into one another and be secured onto the tread. The PATEs 62 have an arrowhead type configuration, see FIG. 4C, with a leading edge 64 defined by a forward point 66. The trailing edge 68 has an identical configuration, forming a concave point 70. The identical leading and trailing edges 64, 68 allow multiple PATEs 62 to be aligned and fitted together in a puzzle-piece like manner.

The ends of the lateral edges 72 have a greater thickness than the central portion of the PATE 62. The greater thickness portions have a configuration corresponding to portions of the circumferential grooves 484 between the center rib 480 and adjacent blocks 482. The center rib 480 is formed with a radial height less than the adjacent blocks 482, see FIG. 4D. When the PATE 62 is fitted onto the tread, the lateral edges 72 embrace the center rib 480, assisting in securing the PATE 62 onto the tread. For such a PATE configuration, which interlocks onto a pre-existing tread element, the groove to be covered by the PATE need not be formed with a stepped width configuration as the groove 40 shown in FIG. 3.

While two specific tread and PATE configurations have been illustrated, the concept of using post-assembled tread elements may be applied to almost any conceived tread pattern in order to create a tread configuration that changes significantly upon wear; the change enabling the tread to maintain desired tire characteristics.

The PATEs have been described as a continuous or a discontinuous ring and as individual elements. The PATEs can have a limited length, can be a combination of long and/or short sub-components and can have tree or network like configurations. A variety of ring and branch like configurations are shown in FIGS. 5A-5K.

Figure 5A:
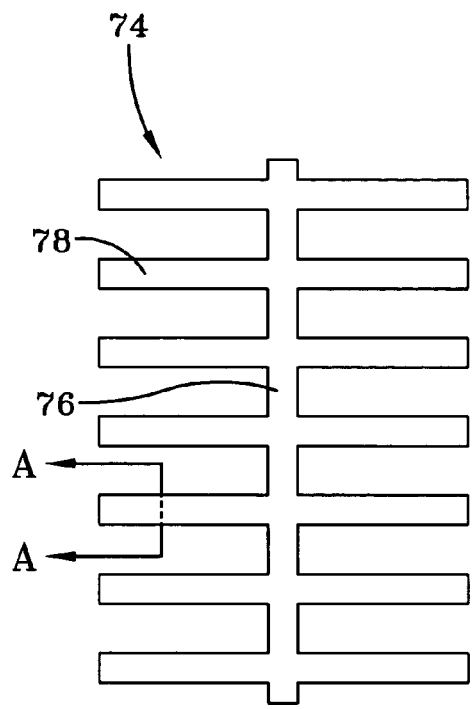

In the PATE of FIG. 5A, the PATE 74 has a main ring 76 with multiple branches 78. The branches 78 are illustrated at being perpendicular to the main ring 76, but may be inclined at any angle from greater than 0° to 90° relative to the ring 76, the inclination angle mimicking that of the inclined lateral grooves in the tread. For the PATE 80 of FIG. 5B, the branches 78 extend from only one side of the main ring 76. Like that the branches 78 of the previous embodiment, the branches 78 may be inclined at any angle relative to the main ring 76. A PATE may be provided with multiple main rings 76 connected by branches 78, see FIG. 5C.

Figure 5B:
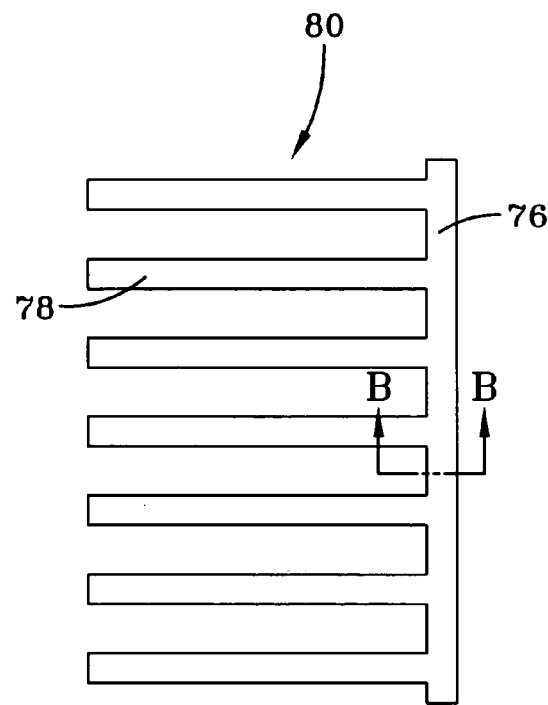
Figure 5C:
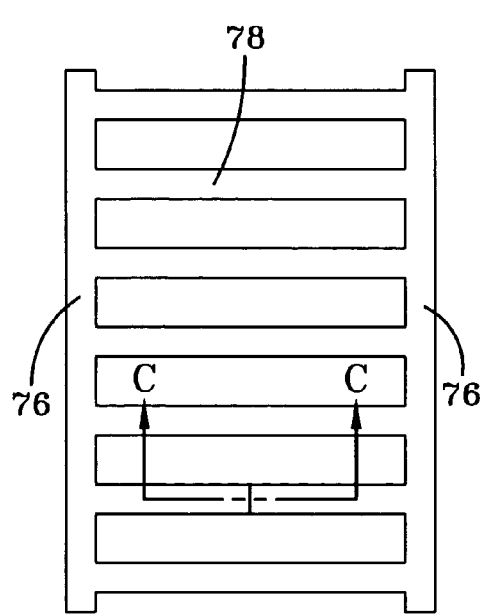
Figure 5D:
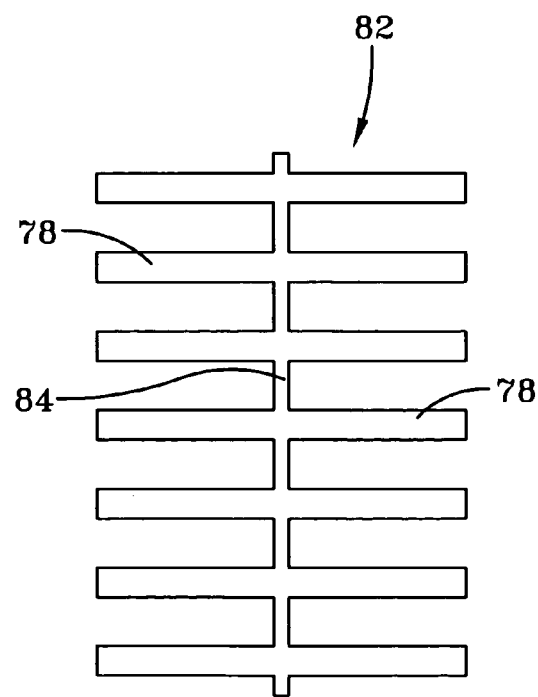

For the PATE 82 of FIG. 5D, the branches 78 are connected by a very small width ring 84. The small width ring 84 can be centrally located or offset similar to the main ring 76 of FIGS. 5A and 5B. The branches 78 may be inclined at any angle relative to the small width ring 84.

FIGS. 5E-5K illustrate various ring configurations for the PATE ring 76. The ring 76 may or may not be provided with branches as illustrated in the preceding figures. In all of the variations, the opposing sides of the ring 76 have repeating geometric configurations. The repeating configurations include those illustrated—triangles (FIG. 5E), squares (FIG. 5F), curvilinear (FIG. 5G), and undulations (FIG. 5H). The repeating configurations may be aligned, as in the aligned undulations of FIG. 5I or aligned curvilinear shape of FIG. 5J. The repeating configurations may extend outward from the sides of the ring 76 or may extend into the opposing sides of the ring, as in FIG. 5K. The cycle length, i.e. the distance between the same location of adjacent repeating configurations, may range from 0.1 cm to 50 cm. For a single ring 76, the opposing sides of the ring may be provided with differing configurations. Additionally, if so desired, only one of the opposing sides of the ring 76 may be provided with the repeating geometric configuration.

The radial location of the PATEs, relative to the tread depth, is such that the radially outer surface of the PATE is flush or very close to the new tread surface. If the radially outer surface of the PATE is below the new tread surface, the tire will pass through a minimum hydroplaning performance by mid-tread life, i.e. when the wear causes the visible voids to disappear, which may become critical to tire performance.

Another factor of the PATEs is the cross-sectional shape along the smallest axis of the PATEs, for example, along lines A-A and B-B in FIGS. 5A and 5B. Different cross sectional shapes are permissible, including, but not limited to, rectangular, tetragonal, trapezoidal, barrel shaped, W-shaped, see FIGS. 6A-6F.

Figure 6A:
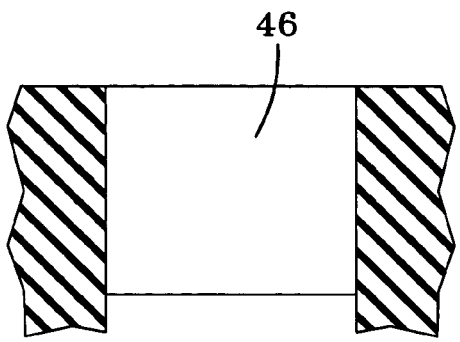
FIGS. 6A-6F illustrate various short width cross-sectional views of post-assembled tread elements.
Figure 6B:
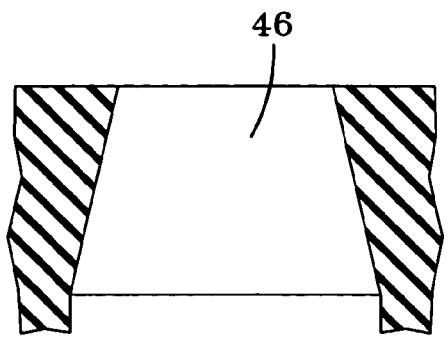
Figure 6C:
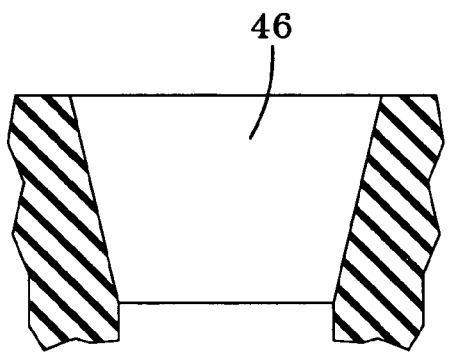
Figure 6D:
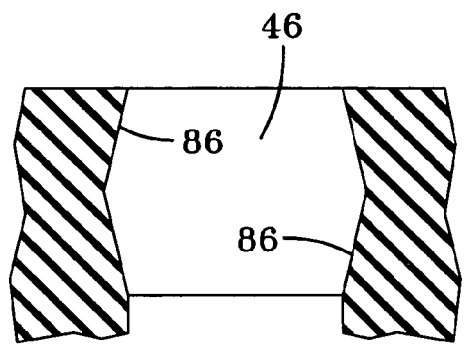
Figure 6E:
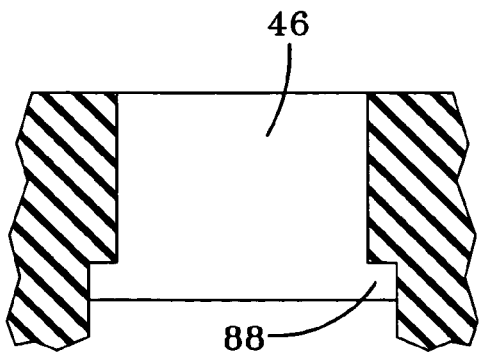
Figure 6F:
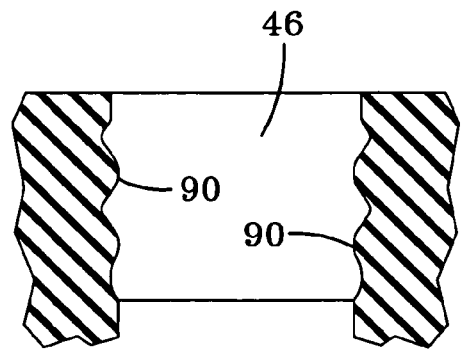

The PATE 46 of FIG. 6A is rectangular shaped, while the PATEs 46 of FIGS. 6B and 6C are trapezoidal shaped in opposing directions. The PATE 46 of FIG. 6D has opposing concave walls 86. The PATE 46 of FIG. 6E has a top hat configuration, forming a securing rib 88 to aid in mechanically securing the PATE 46 onto a tread. Another method of providing mechanical securing means is illustrated in the PATE 46 of FIG. 6F. The PATE 46 has opposing rippled walls 90. The rippled walls 90 will correspond to rippled groove walls in the tread into which the PATE 46 is to be secured.

A void at the radially inner surface of the PATE 46 can contribute to the volume of the hidden void, see FIGS. 7A-7F. The void 92 can be rectangular shaped, see FIG. 7A, trapezoid, see FIG. 7B, triangular, see FIG. 7C, or be provided with a convex configuration, see FIG. 7D. Any cross-section configuration of the void 92 is permissible.

A void 92 at the bottom of the PATE is designed to allow for a more or less progressive opening of a hidden groove while wearing. A progressive groove opening is desirable for different reasons: it guarantees a good wear appearance; it compensates for the continuous loss in hydroplaning due to wearing; and it allows a smooth hydroplaning evolution throughout tire life. It also successfully addresses the issue of the vertical deformation of worn PATEs that can be expected with a flat bottom shaped PATE. The increased area of the PATE also allows for an increase in the contact area between the PATE and the tire groove, resulting in a better bonding.

Figure 7A:
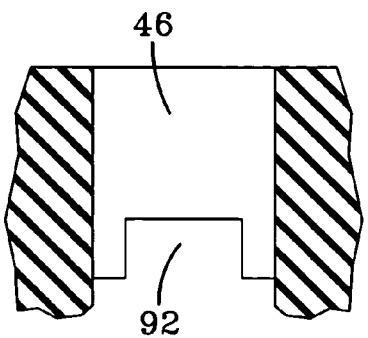
FIGS. 7A-7G illustrate different embodiments of the radially inner surface of post-assembled tread elements.
Figure 7B:
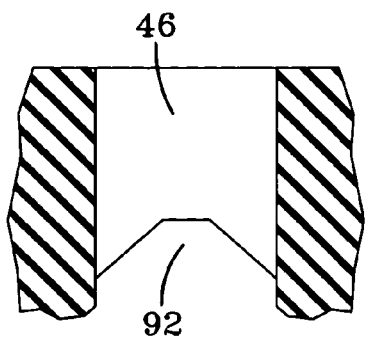
Figure 7C:
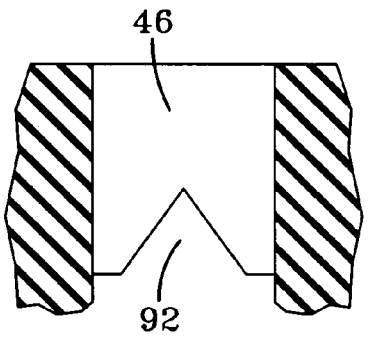
Figure 7D:
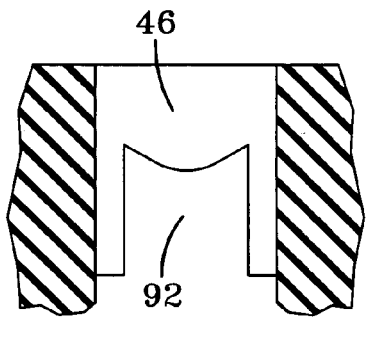
Figure 7E:
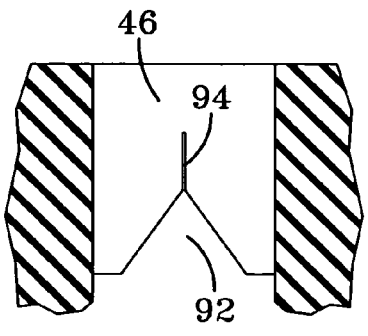
Figure 7F:
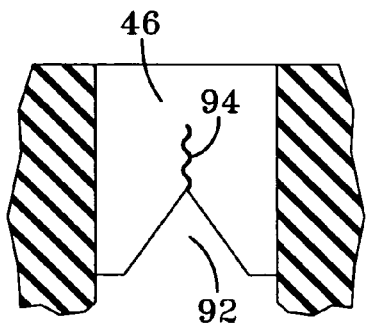
Figure 7G:
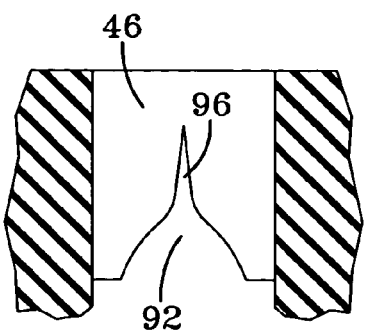

The upper part of the void 92 at the base of the PATE 46 may also be provided with an upwardly extending sipe 94 or small opening 96, see FIGS. 7E-7G. While the void 92 is illustrated as a triangular void, the void may be any configuration. Additionally, the sipe 94 or small opening 96 may be varied in shape. The sipe 94 in the PATE 46 of FIG. 7F has interlocking sipe walls.

Another factor of the PATE 46 is its longitudinal section shape, parallel to the PATE local axis, for example along line C-C of FIG. 5C. The simplest solution is to provide the PATE 46 with a uniform shape along its axis. Both other possibilities have been considered, as discussed further herein. The bottom surface 98 of the PATEs 46 can also feature a variable depth along its length axis, see FIGS.

Figure 8A:
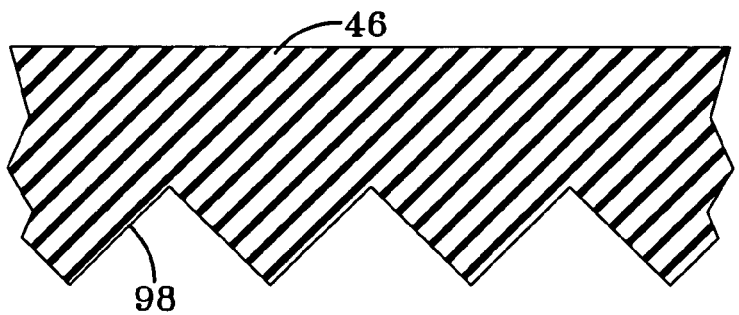
FIGS. 8A-8D and 9 are cross-sectional views of post-assembled tread elements along the longest dimension of the elements.
Figure 8B:
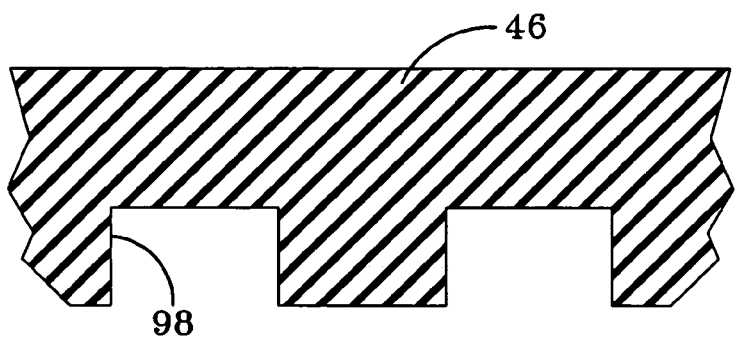
Figure 8C:
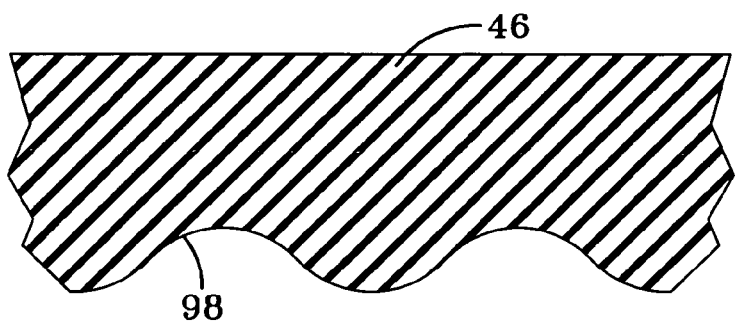

8A-8C. The bottom surface can be zigzagged, see FIG. 8A, repeating squares, see FIG. 8B, or undulating waves, see FIG. 8C. The cycle length of the repeating variable depth can range from 0.1 cm on up; preferably, the cycle length of the repeating variable depth is in the range of 0.1 to 10 cm.

Figure 8D:
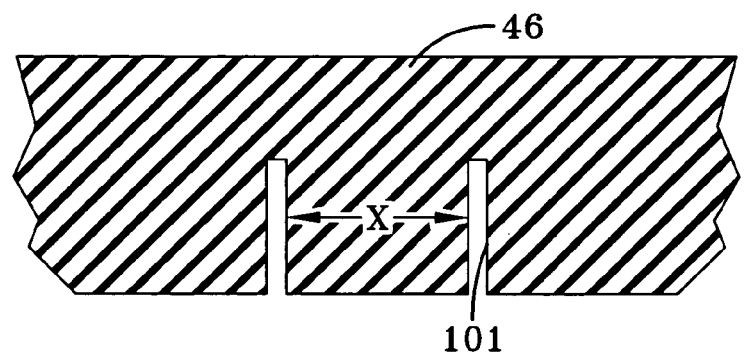

Alternatively, the bottom surface of the PATE 46 can be provided with a series of sipes 101 extending a desired depth y up into the PATE, see FIG. 8D. The radial cuts allow for circumferential decoupling of the PATE during wear of the PATE. Should there be isolated wear of one portion of the PATE, due to the presence of the sipe 101, only the isolate portion of the PATE removes itself from the tread, rather than creating separation of the entire PATE. The sipes 101 are spaced by a distance x of at least 0.1 cm to any distance, preferably the distance x is in the range of 0.1 to 10 cm.

Figure 9:
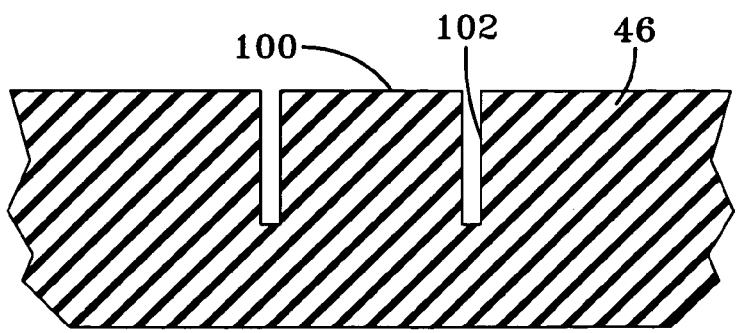

The upper surface 100 of the PATE 46 can be provided with sipes 102 to optimize tread stiffness distribution, see FIG. 9. Such sipes 102 may intersect with any configuration of the bottom surface of the PATE 46 or may be designed to compliment any siping pattern in the molded tread.

Figure 10A:
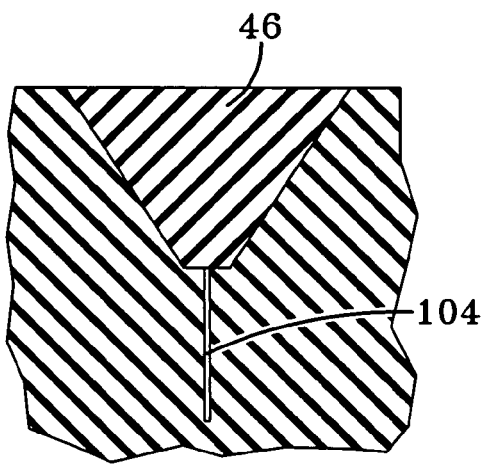
FIGS. 10A-10E are cross-sectional views of post-assembled tread elements and the voids which are being covered by the elements.
Figure 10B:
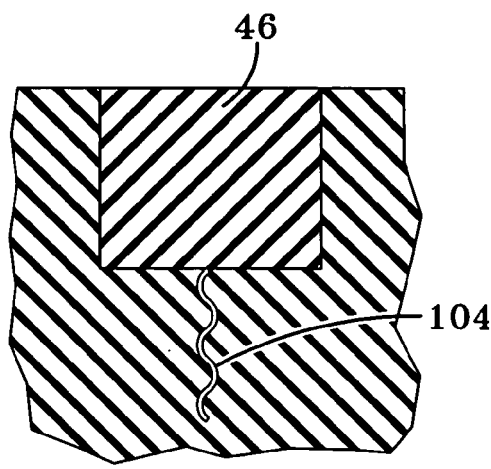
Figure 10C:
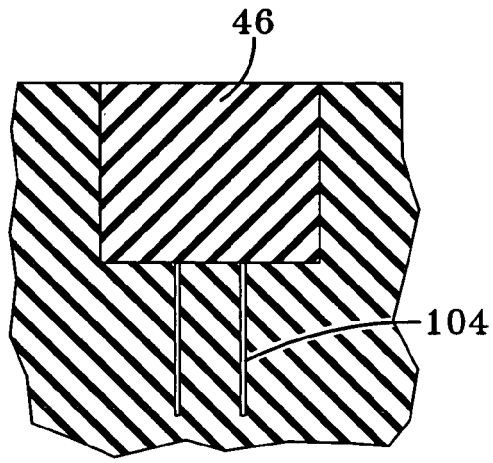
Figure 10D:
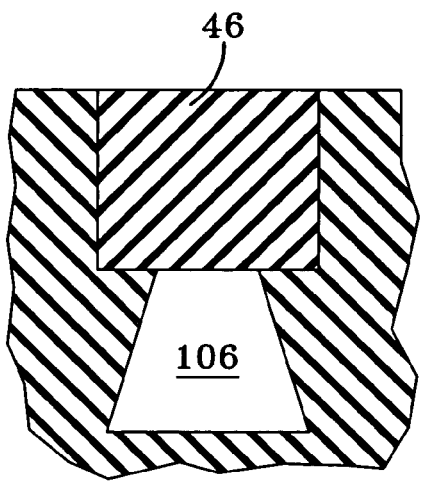
Figure 10E:
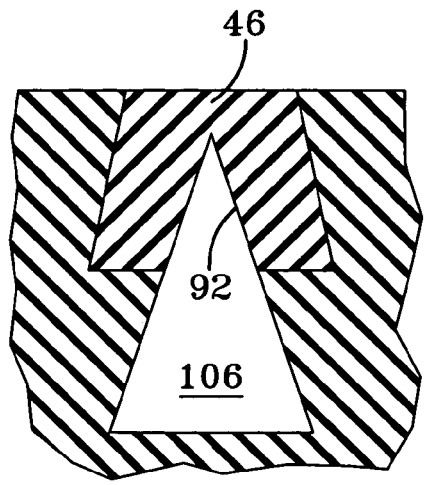

The cross sectional shape of the void hidden by the PATE 46 may be any type of tire tread void. The void may include sipes 104 of any configuration or number, see FIGS. 10A-10C. The void may be standard width groove, extending in any direction on the tread, see FIGS. 1 and 4B. The void may be a groove 106 that increases in width with wear of the tread, see FIGS. 10D and 10E, and may be coordinate with a void 92 in the base of the PATE 46. The depth of the hidden void may be above, on, or below the standard tread baseline. The deeper the void, the greater the effect on worn tire performance.

To secure the PATEs onto the tread, the PATEs may be glued or cold-vulcanized to the original, or just molded, tire tread elements. This guarantees the PATEs to stick to the tire, even in heavy handling conditions, and even during advance wear of the PATEs. Another alternative is to use a green compound interface between the PATEs and the original tread elements. After applying the green compound interface to either the PATE or the tread element, the tire is hot vulcanized. Methods to chemically bond the PATEs to the tread are also discussed in Assignee's co-pending application, U.S. Patent Application Publication No. 2006/0005912 A1, which is fully incorporated by reference herein.

Figure 4D:
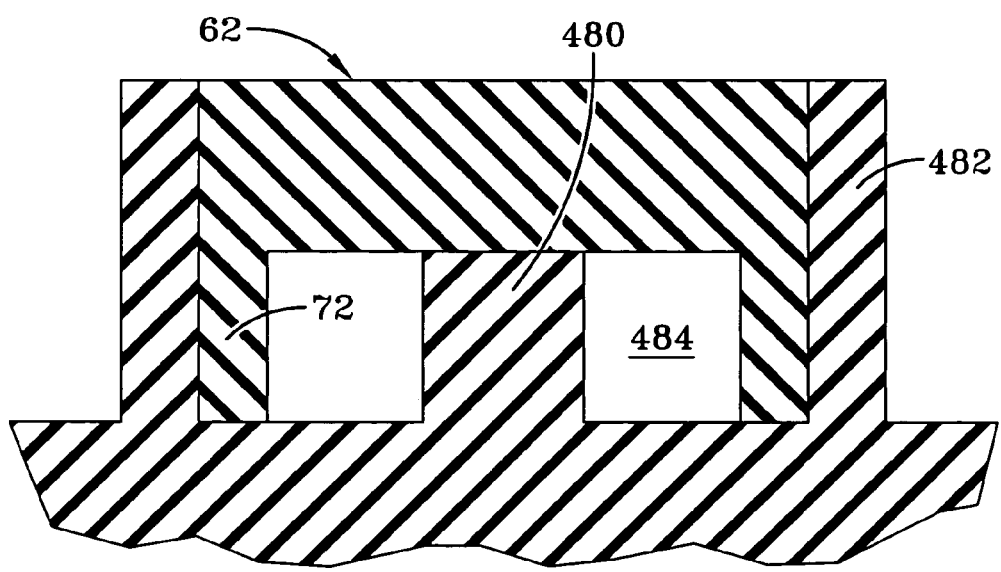
FIG. 4D is a cross-section view along lines 4D-4D in FIG. 4A.

Another method of securing the PATE is to use a mechanical action, such as that illustrated in FIG. 4D. A clamping rib may be formed at the base of the PATE, see FIG. 6E. Alternatively, the sides of the PATE may be formed with a 3-dimensional surface to correspond to matching 3-dimensional groove sidewalls to allow for interlocking between the groove and the PATE, see FIG. 6F.

Any combination of any of the disclosed mechanical and chemical securing means may be used.

The PATE may be formed from the same elastomeric compound used to form the tire tread. Alternatively, the PATE may be formed from an elastomeric compound different from the tire tread. For example, for the tread of FIGS. 1-3, the PATE is located on the tread centerline CL, creating constant contact with the ground during tire operation. It may be desired to provide the center of the tire with a tread compound formulated for greater wear resistance; thus such a PATE compound may be formulated with a greater wear resistance. Alternatively, to expose the hidden voids at a faster rate, the PATEs may be formed of a softer compound that wears faster than the main tread compound.

Additionally, to stiffen the PATE and support the PATE during early tire life, the hidden void 106 covered by the PATE 46 may be provided with a material that is self-eliminated from the void 106 once the PATE 46 is removed due to tread wear. The self-eliminating material is preferably a biodegradable material or a granular material. Examples of self-eliminating materials include sand, sugar, salt, and known biodegradable materials (biodegradable materials being those which degrade integrally into water and carbon dioxide). If the self-eliminating material is provided with a clotting agent, it may also assist in locking or securing the PATE to the tread.

To take advantage of the hidden void formed by the PATEs, the PATEs can be used as either tread wear indicators or in combination with tread wear indicators. Conventional tread wear indicators are located in the bottom of tread grooves. In one embodiment, the bottom of the PATE, such as the clamping rib, may be formed of a colored rubber. Upon wear of the PATE, as the base of the PATE is exposed, the red rubber will alert the consumer to a set level of tread wear. The PATEs can also be used to cover worn text messages located at the base of a groove. The text message will only appear visible to the consumer after the PATE has been worn off.

Another way to use the PATE as a wear indicator is to use a finite length, non-connected PATE as a "witness block." The witness block PATE may be formed of a different rubber material or formed of a colored rubber, the PATE being readily distinguishable from the remaining tread. Once the witness block PATE is worn off, the consumer is aware that a certain level of tread has been achieved. Multiple witness block PATES of varying radial depth may be used to indicate progressive wear levels to the consumer.

Another use of the PATE is to use one or more blocks of a rubber or rubber like material with traction properties just inferior to those of the rest of the tread. When the PATE elements have reached their limit of adherence in the tread, the PATE will start slipping prior to the rest of the tread during tire rotation. The detection of slippage may be made through a sensor placed in a witness block that detects slippage and communicates this information to the vehicle operator.

Numerous variations of the PATE have been disclosed. Any combination of features may be employed in the formation of the PATE and in the application of the PATE to a tire tread. The configuration of both the PATE and the cured tire tread should be selected to optimize the worn tire performance in an attempt to maintain the tire's wet performance characteristics. The PATE concept results in a stiff tread with a closed design when the tire is new and softer tread with an open design when the tire is worn. This allows for similar performance for both the new and the worn tire.

What is claimed is:

1. A tire having a tire tread having a non-skid depth d, the tread comprising tread elements separated by a tread groove and a circumferential or lateral groove in at least one of the tread elements, wherein a separately cured, wearable filler is located in the radially outermost portion of the circumferential or lateral groove or a portion of the circumferential or lateral groove, the wearable filler being chemically bonded or mechanically secured in the groove or groove portion to the interior surface of the groove or groove portion such that the radially outer surface of the wearable filler is substantially flush and continuous with the ground contacting surface of the at least one tread element, the wearable filler covering the groove or groove portion with a groove void being created radially inward of the wearable filler, the groove void being exposed upon wear of the tread, each of the tread groove and circumferential or lateral groove having the non-skid depth d.

2. The tire of claim 1 wherein the wearable filler is manufactured separately from the tire tread, and inserted into the circumferential or lateral groove or a portion of the circumferential or lateral groove.

3. The tire of claim 1 wherein the circumferential or lateral groove or a portion of the circumferential or lateral groove has a pair of opposing groove sidewalls, wherein the radially outer portion of the opposing groove sidewalls of the circumferential or lateral groove or the portion of the circumferential or lateral groove has a greater width, as measured between opposing groove sidewalls, than the radially inner portion of the opposing groove sidewalls of the circumferential or lateral groove or the portion of the circumferential or lateral groove, resulting in a step portion in the circumferential or lateral groove or a portion of the circumferential or lateral groove, the wearable filler being located in the greater width portion of the circumferential or lateral groove or a portion of the circumferential or lateral groove.

4. The tire of claim 1 wherein the wearable filler is located in a circumferential groove and the wearable filler has a ring shaped configuration having a length similar to the circumferential length of the tire tread.

5. The tire of claim 4 wherein a plurality of branches extend from the ring shaped wearable filler, the branches being inclined at angles ranging from greater than 0° to 90° relative to the ring portion of the wearable filler.

6. The tire of claim 4 wherein the ring shaped configuration of the wearable filler has opposing sides and at least one of the opposing sides is formed with repeating geometric configurations.

7. The tire of claim 1 wherein the wearable filler has a variable depth in the radial direction of the tread.

8. The tire of claim 7 wherein the variable depth of the wearable filler occurs along the shortest length axis of the filler.

9. The tire of claim 7 wherein the variable depth of the wearable filler occurs along the greatest length axis of the filler.

10. The tire of claim 1 wherein the wearable filler is comprised of similar interlocking individual elements, each wearable filler element having a length less than the circumferential length of the tire tread.

11. The tire of claim 1 wherein the wearable filler is comprised of at least one non-connected individual element, the at least one element being located at a preselected location in the tread.

12. The tire of claim 1 wherein the wearable filler has at least one sipe therein.

13. The tire of claim 12 wherein the sipe is located on the radially inner side of the wearable filler.

14. The tire of claim 12 wherein the sipe is located on the radially outer side of the wearable filler.

15. The tire of claim 1 wherein the groove void created radially inward of the wearable filler is at least one sipe.

16. The tire of claim 1 wherein the wearable filler is formed from an elastomeric material and the tire tread is comprised of a different elastomeric material.

17. The tire of claim 1 wherein the wearable filler is formed from an elastomeric material and a radially inner portion of the wearable filler is formed from a colored elastomeric material differing in color from a radially outer portion of the wearable filler.

18. The tire of claim 1 wherein, within the groove void created radially inward of the wearable filler, a self-eliminating material is located.

19. The tire of claim 1 wherein the wearable filler has a configuration that enables the wearable filler to mechanically engage the circumferential or lateral groove or a portion of the circumferential or lateral groove.

* * * * *